March 28, 1933.   H. H. ROBINSON   1,903,068
CONSTRUCTION FOR ORIFICE METER FITTINGS
Filed March 4, 1931   2 Sheets-Sheet 1
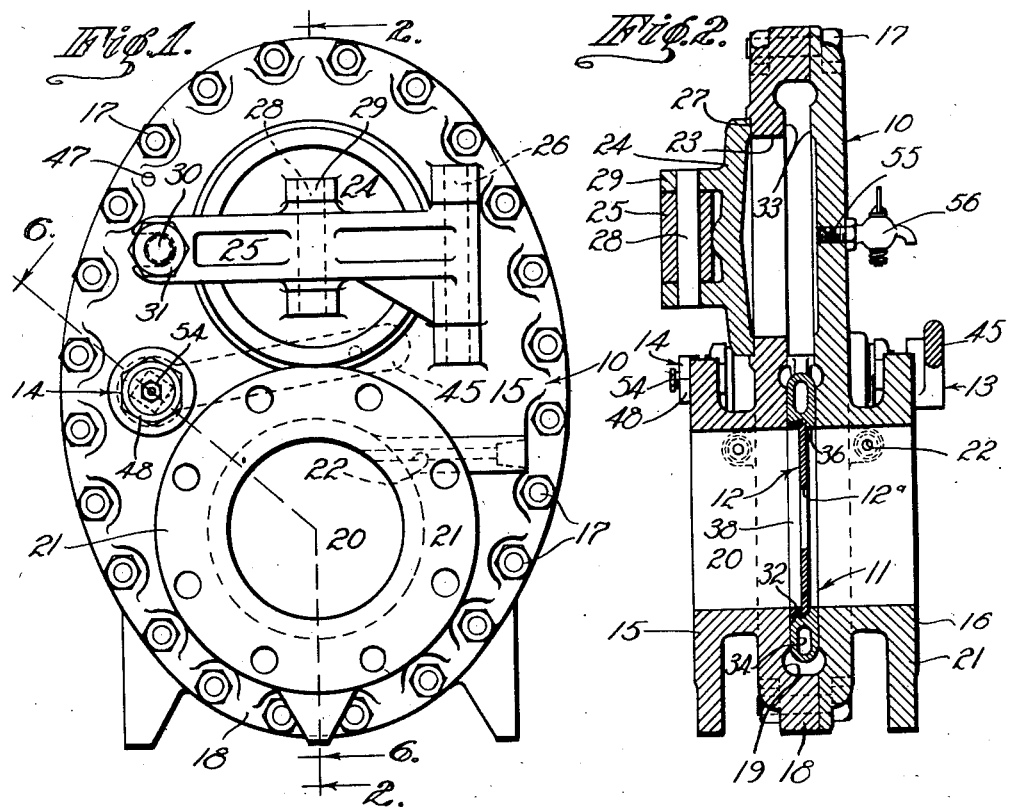
Inventor
Henry H. Robinson
By W. H. Maxwell
His Attorney

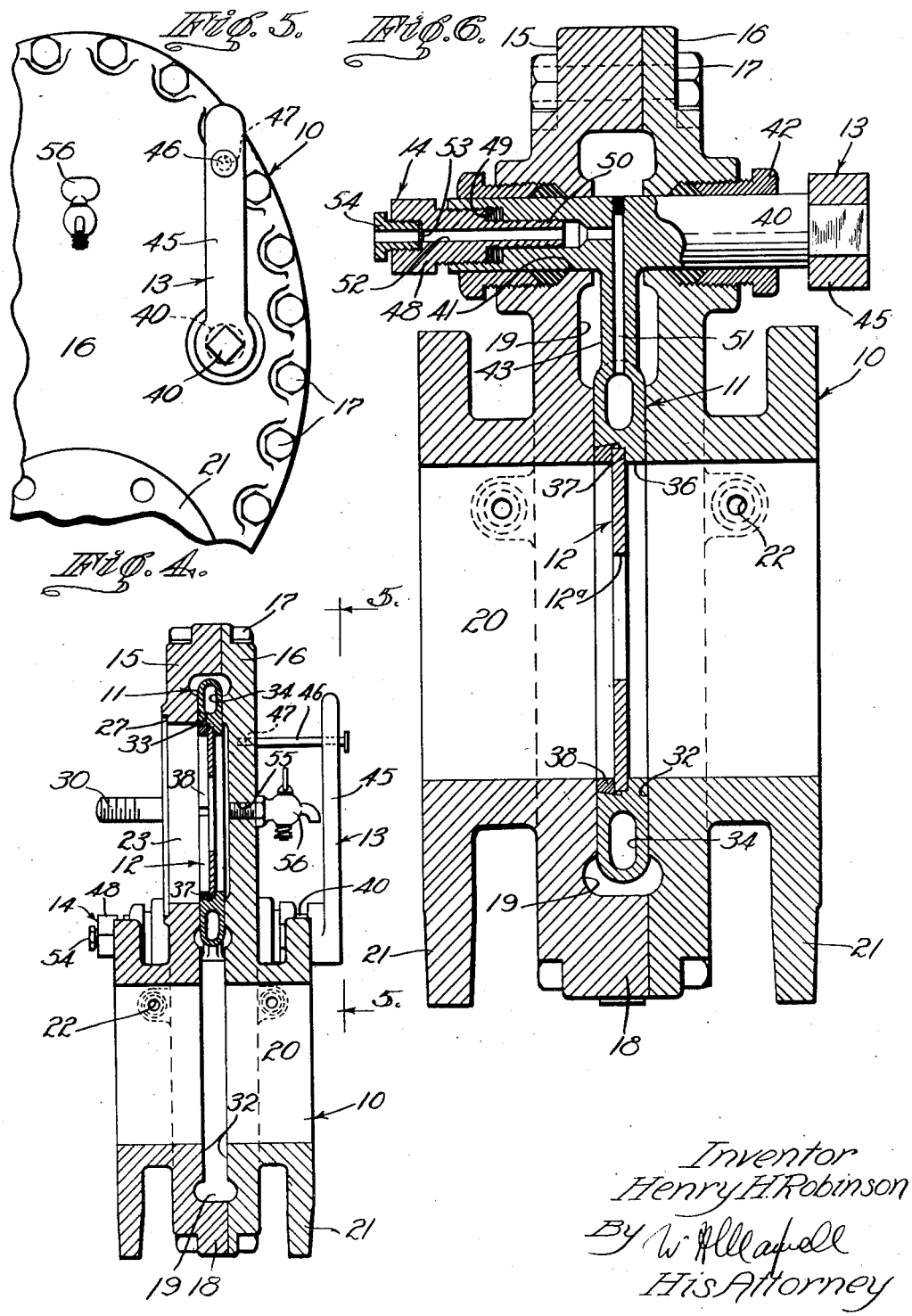

Patented Mar. 28, 1933

1,903,068

UNITED STATES PATENT OFFICE

HENRY H. ROBINSON, OF LOS ANGELES, CALIFORNIA, ASSIGNOR TO ROBINSON ORIFICE FITTING COMPANY, OF LOS ANGELES, CALIFORNIA, A CORPORATION OF NEVADA

CONSTRUCTION FOR ORIFICE METER FITTINGS

Application filed March 4, 1931. Serial No. 520,098.

This invention has to do with orifice meters for metering the flow of fluids through conduits, and relates particularly to orifice meter fittings. It is a general object of the invention to provide a simple, practical orifice meter fitting in which an orifice disc or plate may be easily and quickly replaced without loss of pressure or leakage of fluid.

Orifice meters employed for determining or metering the rate of flow of fluids through pipe lines, etc., usually include a fitting adapted to be interposed in a pipe line and carrying an orifice disc arranged to pass the fluid. Because of wear, variations in the rate of flow of the fluid, and other factors, it is necessary to change or replace the orifice discs from time to time. It has been found difficult to provide an orifice meter fitting of the general character referred to that is simple, practical, and effective in making fluid-tight seal about the orifice disc or plate.

An object of this invention is to provide an orifice meter fitting that includes an improved means for making an effective fluid-tight seal about the orifice disc when in position across the fluid conduit and/or when in position for exchange or replacement.

Another object of the invention is to provide an orifice meter fitting that includes a sealing member for carrying the orifice disc or plate, which member is operable between a position where it holds the plate across the conduit opening and seals about the opening and a position at a hand hole where the plate is accessible for replacement.

It is another object of the invention to provide an orifice meter fitting of the character mentioned in which the orifice discs may be easily and quickly replaced without leakage of fluid and without stopping the flow of fluid through the conduit.

Another object of the invention is to provide an orifice meter fitting of the general character referred to that embodies an improved expansible sealing member for carrying the orifice discs and that is operable to effectively seal with spaced seats around the conduit opening and with spaced seats at the hand opening where the disc is readily accessible for replacement.

A further object of the invention is to provide an orifice meter fitting of the character mentioned that includes simple means for operating the sealing member between the two positions referred to and for expanding it into tight sealing engagement with the sets of spaced seats.

Other objects and features of my invention will be best and more fully understood from the following detailed description of a typical form and application of the invention, throughout which description reference is had to the accompanying drawings, in which:

Fig. 1 is an end view of the fitting provided by the present invention. Fig. 2 is a vertical detailed sectional view taken as indicated by line 2—2 on Fig. 1. Fig. 3 is a vertical central section of the device, being a view illustrating the orifice disc in position for removal. Fig. 4 is a view similar to Fig. 2, showing the orifice disc in a position where it is accessible for replacement. Fig. 5 is an end view of a portion of the fitting, being a view taken substantially as indicated by line 5—5 on Fig. 4. Fig. 6 is an enlarged detailed sectional view taken as indicated by line 6—6 on Fig. 1.

The device provided by the present invention includes, generally, a body 10 adapted to be arranged or interposed in a pipe line, an expansible sealing member 11 for carrying an orifice plate or disc 12, means 13 for shifting or operating the sealing member 11 between a position where it supports the orifice disc across the conduit opening and a position where the disc is accessible for replacement, and means 14 for expanding the sealing member 11.

The body 10 of the fitting is sectional, consisting of a section 15 and a section 16. The sections 15 and 16 are elliptical in their general configuration and are connected adjacent their peripheries or edges by bolts 17. An inwardly or axially projecting flange 18 is provided at the edge or periphery of the section 15 to space the sections apart and provide a chamber 19 between the sections. A fluid passage 20 extends transversely through the body 10. The passage 20 is provided to communicate with the interior of the pipe line or conduit in which the fitting is connected and is preferably of the same configuration and size as the interior of the pipe. The opening or passage 20 passes through the body 10 adjacent what I will term the inner end of the body. The central longitudinal axis of the fluid passage 20 intersects and is normal to the major axis of the body 10. Flanges 21 may be provided on the body 10 at the ends of the passage 20 to facilitate connection with the pipe line or conduit. In accordance with the invention, the passage 20 is spaced inwardly from the periphery of the chamber 19 so that the chamber completely intersects and surrounds the passage. Openings 22 are provided in the walls of the body 10 to communicate with the passage 20 at opposite sides of the chamber 19. The openings 22 are adapted to receive pipes connecting with an instrument (not shown) for indicating or recording differences in pressure at opposite sides of the disc 12.

A hand hole or opening 23 is provided in the section 15 to communicate with the body chamber 19. The opening 23 is provided to make the orifice plate 11 accessible for exchange or replacement when the carrier and member 11 is in the position illustrated in Figs. 3 and 4 of the drawings. The hand opening 23 may be round and sufficiently large to freely pass orifice discs into and out of the chamber 19. The longitudinal axis of the opening 23 intersects the major axis of the body 10 so that the opening 23 is in vertical alignment with the fluid passage 20. The opening 23 is normally closed by a plate or closure 24.

The closure 24 is mounted on the body 10 so that it may be releasably locked in the closed position across the opening 23 and may be easily opened or swung outwardly when desired. A lever or arm 25 is pivoted at one end to the section 15 and extends diametrically across the closure 24. The arm 25 may be hinged or pivoted to the section 15 by a pin 26. The closure 24 is pivoted to the arm 25 so that it may center itself on a seat 27 around the opening 23. A pivot pin 28 passes through an opening in the arm 25 and openings in lugs 29 on the outer side of the closure to pivotally connect the closure with the arm. The outer or free end of the arm 25 is bifurcated or yoked and passes a stud 30 projecting from the section 15. A nut 31 is removably screw-threaded on the stud 30 to engage the arm 25 and clamp the closure 24 in the closed position on the seat 27.

The sealing member 11 is arranged within the chamber 19 of the body and is provided to carry the orifice disc 12 and to seal with the inner walls of the body around the disc. The sealing member 11 is an annular part operable by the means 13 between a position where it surrounds the passage 20 and a position at the hand hole 23. In accordance with the invention, the sealing member 11 is adapted to co-operate with spaced seats 32 on the walls of the chamber 19 around the passage 20 and spaced seats 33 on the chamber wall at the opening 23. The seats 32 are opposed, being provided on the opposite side walls of the chamber 19, and are annular, completely surrounding the fluid passage 20. The seats 32 are flat and parallel. The outer set of seats 33 are provided on the opposed walls of the chamber 19 at the hand opening 23. The seats 33 are annular, one seat surrounding the inner end of the hand opening 23, and the other being directly opposite on the inner side of the section 16. The seats 33 are flat and parallel. In the particular form of the invention illustrated in the drawings, the two sets of spaced opposed seats 32 and 33 are formed on annular bosses on the inner sides of the sections of the body.

The disc carrier and sealing member 11 is shaped and proportioned to have effective co-operation with the seats 32 and 33 and so as to be readily operable through the chamber 19 between a position around the passage 20 and a position at the opening 23. The sealing member 11 is of elongated cross section, having flat parallel sides surfaced to effectively co-operate with the seats in the body, and having a rounded periphery. In accordance with the invention, the sealing member 11 is hollow or tubular, having an annular opening 34. The member 11 is adapted to be expanded by internal fluid pressure, and its side walls are preferably comparatively thin so that its sealing faces may be brought into pressural sealing engagement with the seats 32 and 33. The annular sealing member 11 may be formed of cast bronze, or the like.

Spaced projections 35 are provided on the periphery of the sealing member 11 for limiting movement of the member through the chamber 19 and for centering it on the seats 32 and 33. The projections 35 are adapted to engage the peripheral walls of the chamber 19 to properly position the sealing member on the seats 32 and 33.

The typical orifice disc shown in the drawings is an annular plate having a central opening $12^a$.

The orifice disc 12 may be removably mounted in the annular sealing member 11 in any suitable manner. The opening 36 of the sealing member 11 is in direct register with the fluid passage 20 when the member is in co-operation with the seats 32. The opening 36 is of the same configuration and size as the fluid passage 20 to have its walls flush with the walls of the passage. The disc 12 is removably retained in the opening 36 so as to extend transversely across the fluid passage 20. In the form of the invention illustrated in the drawings, the orifice disc or plate 12 is seated against an annular seat or shoulder 37 in the opening 36. A split ring 38 is arranged in an undercut portion of the opening 36 to hold the plate 12 in position on the shoulder 37. The periphery of the split ring 38 co-operates with outwardly convergent walls of the opening so that it is normally held against displacement. The interior of the ring 38 is flush with the walls of the fluid passage 20. The orifice plate 12 is removably mounted in the sealing member 11 so that it may be easily and quickly removed when at the opening 23.

The means 13 for shifting or operating the sealing member and disc carrier 11 between the seats 32 and 33 includes a shaft 40 rotatably or pivotally carried in transverse openings 41 in the body sections 15 and 16. The openings 41 are provided in the body 10 at points offset from the major axis of the body and between the passage 20 and opening 23. The shaft 40 extends completely through the body 10 and has its ends projecting outwardly in opposite directions from the sections 15 and 16. Suitable packing glands 42 are provided in the openings 41 to seal about the shaft 40. An arm 43 connects the shaft 40 with the sealing member 11. Reinforcing flanges or webs 44 may be provided at opposite sides of the arm 43 to strengthen the connection between the shaft 40 and the sealing member. In practice, the shaft 40, the arm 43, and sealing member 11 may be integral or in the nature of a single casing of bronze, or the like. An operating lever or handle 45 is provided on the end of the shaft 40 projecting from the section 16. It will be readily apparent how the handle 45 may be turned or operated to move the sealing member 11 from its normal position in co-operation with the seats 32 to the position at the opposing seats 33. Means may be provided for locking or setting the handle 45 against movement when the sealing member 11 is in co-operation with the seats 33 at the opening 23. A removable pin 46 may be arranged through an opening in the handle 45 to extend into a socket 47 in the section 16 to releasably hold the handle 45 in the up position illustrated in Figs. 4 and 5 of the drawings.

The means 14 for expanding the sealing member 11 is in the nature of fluid pressure means and is carried by the operating means 13. The fluid pressure means 14 includes a gland or plunger 48 threaded into an opening 49 in the shaft 40. The plunger 48 may be provided with an enlarged outer polygonal end or head at the end of the shaft 40 to facilitate its operation. The plunger 48 may be provided with an inner end part 50 of reduced diameter to slidably operate in a reduced portion of the opening 49. A port 51 extends through the arm 43 and shaft 40 to connect the opening 49 with the interior of the sealing member 11. Suitable packing or sealing means may be provided on the reduced plunger part 50. In the case illustrated, spaced or labyrinth sealing grooves are provided on the inner plunger part 50. The opening 34 or interior of the sealing member 11, the port 51, and opening 49 may contain a suitable liquid, for example, grease, or the like. It will be apparent how operation or threading of the plunger 48 into the opening 49 causes the sealing member 11 to be expanded by internal fluid pressure so that it may effectively seal with the seats 32 or the seats 33. The reduced end part 50 of the plunger provides for a pressural advantage whereby the sealing member 11 may be readily expanded with slight effort.

The invention provides a safety or relief means in connection with the fluid pressure means. A central longitudinal passage 52 is provided in the plunger 48. The inner end of the passage 52 communicates with the reduced part of the opening 49, while the outer end of the passage 52 is normally closed by a frangible closure disc 53. The frangible closure 53 may be retained in position across the passage 52 by a tubular nut 54. The frangible closure disc 53 is designed to fail or burst upon an excessive pressure being developed in the means 14 which might be dangerous or destructive to the sealing member 11.

Means is provided for relieving pressure in the portion of the chamber 19 within the seats 33 when it is desired to replace an orifice disc or plate in the carrier 11. An opening 55 is provided in the body section 16 to communicate with the chamber 19 at a point opposite the opening 23. The opening 55 is provided to receive the stem of a relief valve or pet cock 56.

It is believed that the operation of the orifice meter fitting provided by the present invention will be readily apparent from the foregoing detailed description. During normal operation, the parts are positioned as illustrated in Figs. 2 and 6 of the drawings. In this position the sealing member 11 co-operates with the seats 32 and holds the orifice plate 12 in position across the passage 20. A suitable internal pressure may be maintained in the sealing member 11 to retain it in an expanded state where its side faces are in tight sealng engagement with the opposing seats 32. It will be readily apparent how the fluid pressure within the sealing member may be readily controlled by operating or threading the plunger 48 through the opening 49. When the sealing member 11 is in co-operative sealing engagement with the seats 32, there is no possibility of leakage from the fitting. When it is desired to exchange or replace the orifice disc 12, the fluid pressure within the sealing member may be wholly or partially removed by threading the plunger 48 outwardly in the opening 49. The handle 45 may then be swung upwardly to shift the sealing member and disc carrier to the position between the spaced seats 33. A suitable fluid pressure may then be provided in the sealing member 11 so that it tightly seals with the outer seats 33. When the sealing member 11 is in tight pressural engagement with the seats 33, the pressure may be released from the chamber 19 within the sealing member by opening the valve 56. The closure 24 may then be opened by removing the nut 31 and swinging the arm 25 outwardly. The sealing member 11 is then readily accessible through the opening 23 so that the orifice disc may be easily and quickly replaced. It is obvious that the sealing member 11 makes a tight fluid seal between the seats 33 so that there is no danger of leakage at the opening 23. Upon the orifice disc being replaced, the closure may then be operated to the closed position and pressure relieved from within the sealing member 11 so that it may be more readily shifted to its normal position around the fluid passage 20. During the replacing of the orifice disc, the sealing member 11 may be held against downward or inward movement by the locking pin 46.

Having described only a typical preferred form of my invention, I do not wish to limit myself to the specific details set forth, but wish to reserve to myself any changes or variations that may appear to those skilled in the art or fall within the scope of the following claims.

Having described my invention, I claim:

1. An orifice meter fitting including, a body having a fluid passage, spaced seats in the body around the passage, a shiftable expansible member in the body for sealing with the spaced seats, means for shifting the member into and out of position between the seats, fluid pressure means for expanding the member, and an orifice disc carried by the member.

2. An orifice meter fitting including, a body having a fluid passage, spaced seats in the body around the passage, an expansible member for sealing with the spaced seats, fluid pressure means for expanding the member, and an orifice disc carried by the member.

3. An orifice meter fitting including, a body having a fluid passage, spaced opposed seats in the body around the passage, an expansible sealing member for co-operating with the seats, means for mounting an orifice disc on the member, and fluid pressure means for expanding the member.

4. An orifice meter fitting including, a body having a fluid passage, spaced opposed seats in the body around the passage, an expansible sealing member for co-operating with the seats, means for removably mounting an orifice disc on the member, means for operating the member into and out of position between the seats, and fluid pressure means for expanding the member.

5. An orifice meter fitting including, a body having a fluid passage and an opening spaced from the passage, spaced seats in the body around the passage, spaced seats in the body at the opening, an expansible sealing member for co-operating with the seats, means for operating the member between positions between the two sets of spaced seats, and fluid pressure means for expanding the member.

6. An orifice meter fitting including, a body having a fluid passage and an opening spaced from the passage, spaced seats in the body around the passage, spaced seats in the body at the opening, a tubular expansible sealing member for co-operating with the seats, means for operating the member between positions between the two sets of spaced seats, means for removably mounting an orifice plate on the member, and fluid pressure means for expanding the member.

7. An orifice meter fitting including, a body having a fluid passage and an opening spaced from the passage, spaced seats in the body around the passage, spaced seats in the body at the opening, an expansible sealing member for cooperating with the seats, means for operating the member between positions between the two sets of spaced seats, and fluid pressure means for expanding the member.

8. An orifice meter fitting including, a body having a fluid passage and a chamber intersecting the passage, spaced opposed annular seats in the chamber around the passage, an annular tubular expansible sealing member for co-operating with the seats, and means for shifting the sealing member into and out of position between the seats.

9. An orifice meter fitting including, a body having a fluid passage and a chamber intersecting the passage, spaced opposed annular seats in the chamber around the passage, an annular tubular expansible sealing member for co-operating with the seats, means for expanding the member, and means for shifting the sealing member into and out of position between the seats.

10. An orifice meter fitting including, a body having a fluid passage and a chamber intersecting the passage, spaced opposed annular seats in the chamber around the passage, an annular tubular expansible sealing member for co-operating with the seats, fluid pressure means for expanding the member, and means for shifting the sealing member into and out of position between the seats.

11. An orifice meter fitting including, a body having a fluid passage and a chamber intersecting the passage, spaced opposed annular seats in the chamber around the passage, an annular tubular expansible sealing member for co-operating with the seats, means removably mounting an orifice plate in the sealing member, and means for expanding the sealing member.

12. A device of the character described including, a body having a fluid passage and a chamber intersecting the passage, there being an opening in the wall of the chamber spaced from the passage, spaced opposed seats in the chamber around the passage, spaced opposed seats in the chamber at the opening, a tubular expansible sealing member in the chamber for co-operating with the seats, means for operating the member between positions between the two sets of the seats, and fluid pressure means for expanding the member.

13. A device of the character described including, a body having a fluid passage and a chamber intersecting the passage, there being an opening in the wall of the chamber spaced from the passage, spaced opposed seats in the chamber around the passage, spaced opposed seats in the chamber at the opening, an expansible sealing member in the chamber for co-operating with the seats, means for operating the member between positions between the two sets of the seats, means for removably attaching an orifice plate to the member, and fluid pressure means for expanding the member.

14. A device of the character described including, a body having a fluid passage and a chamber intersecting the passage, there being an opening in the wall of the chamber spaced from the passage, spaced opposed seats in the chamber around the passage, spaced opposed seats in the chamber at the opening, a tubular expansible sealing member in the chamber for co-operating with the seats, means for operating the member between positions between the two sets of the seats, and fluid pressure means on the first-mentioned means for expanding the sealing member, including a plunger operable in an opening in the first mentioned means, said opening communicating with the interior of the sealing member.

15. A device of the character described including, a body having a fluid passage and a chamber intersecting the passage, there being an opening in the wall of the chamber spaced from the passage, spaced opposed seats in the chamber around the passage, spaced opposed seats in the chamber at the opening, an expansible sealing member in the chamber for co-operating with the seats, means for operating the member between positions between the two sets of the seats, and fluid pressure means on the first-mentioned means for expanding the sealing member.

16. A device of the character described including a body having a fluid passage and a chamber intersecting the passage, there being an opening in the wall of the chamber spaced from the passage, spaced opposed seats in the chamber around the passage, spaced opposed seats in the chamber at the opening, a tubular expansible sealing member in the chamber for co-operating with the seats, means for operating the sealing member into positions between the seats, including a pivoted shaft, and means for expanding the member including a plunger operable in an opening in the shaft communicating with the interior of the member.

17. A device of the character described including, a body having a fluid passage and a chamber intersecting the passage, there being an opening in the wall of the chamber spaced from the passage, spaced opposed seats in the chamber around the passage, spaced opposed seats in the chamber at the opening, a tubular expansible sealing member in the chamber for co-operating with the seats, means for operating the sealing member into positions between the seats including, a pivoted shaft, and means for expanding the member including a plunger screw threaded in an opening in the shaft communicating with the interior of the member.

18. A device of the character described including, a body having a fluid passage and a chamber intersecting the passage, there being an opening in the wall of the chamber spaced from the passage, spaced opposed seats in the chamber around the passage, spaced opposed seats in the chamber at the opening, a tubular expansible sealing member in the chamber for co-operating with the seat, means for operating the sealing member into positions between the seats, including a pivoted shaft, and a connection between the shaft and member, the connection and shaft being integral with the sealing member, and fluid pressure means in the shaft for expanding the member.

19. An orifice meter fitting including, a body having a fluid passage, an expansible member in the body for supporting an orifice disc across the passage and for sealing with the body around the passage, fluid pressure means for expanding the member and including an actuating part accessible at the exterior of the body, and means for operating the member into and out of position at the passage.

20. An orifice meter fitting including, a body having a fluid passage, an expansible member for supporting an orifice disc across the passage and for sealing with the body around the passage, means for operating the member into and out of position at the passage, and fluid pressure means on the first-mentioned means for expanding the member.

21. An orifice meter fitting including, a body having a fluid passage, an expansible member for supporting an orifice disc across the passage and for sealing with the body around the passage, fluid pressure means for expanding the member, and means for operating the member into and out of position at the passage.

In witness that I claim the foregoing I have hereunto subscribed my name this 10th day of February, 1931.

HENRY H. ROBINSON.